June 29, 1954 G. K. TEAL 2,682,501

PREPARATION OF TWO-SIDED MOSAIC

Filed Dec. 29, 1948

INVENTOR
G. K. TEAL
BY Hugh S. Wertz
ATTORNEY

Patented June 29, 1954

2,682,501

UNITED STATES PATENT OFFICE 2,682,501

PREPARATION OF TWO-SIDED MOSAIC

Gordon K. Teal, Summit, N. J., assignor to Bell Telephone Laboratories, Incorporated, New York, N. Y., a corporation of New York Application December 29, 1948, Serial No. 67,914

2 Claims. (Cl. 204—15)

This invention relates to electro-optical devices and more specifically to methods of making target or screen structures for use in television transmitter tubes.

It has long been recognized, in the development of electron camera tubes for generating picture signals at a television transmitting station, that there are many advantages in projecting an electron image of the object for transmission onto one side of the screen of the tube and scanning the opposite side of the screen with a cathode ray beam formed in the tube. An example of a camera tube employing such a "two-sided" target or screen is the so-called "image orthicon" tube, described in an article entitled "The image orthicon—a sensitive television pick-up tube," by Albert Rose, Paul K. Weimer and Harold B. Law, appearing in the July 1946 issue of the Proceedings of the I. R. E., beginning on page 424. The two-sided target makes possible the separation of charging and discharging processes so that the sensitizing procedures and electric fields appropriate to each can be incorporated in the tube without mutual interference. The target must conduct charges between its two sides or surfaces but not along either surface. Moreover, it should have a conducting element therein or nearby to act as the common capacitor plate for the separate picture elements. It has been found very difficult to construct satisfactorily commercial targets of this type.

It is an object of the present invention to provide novel and improved methods for making two-sided electron camera tube targets which have a large number of elemental discrete conducting elements per square inch.

In an exemplary method in accordance with the invention, a nickel screen is coated with an insulator such as cryolite and is sprayed with wax or asphaltum on the bottom thereof. A thin film of silver is then evaporated on the insulated side of the screen; a thin film of wax is applied over the silver film on to the top surface of the screen, and silver plugs are electroplated into the holes thereof. The wax or asphaltum films are then removed by a suitable solvent and the silver film is removed by an electrolytic process. This method produces a two-sided mosaic screen having plugs with protruding heads on both sides.

Figure 9:
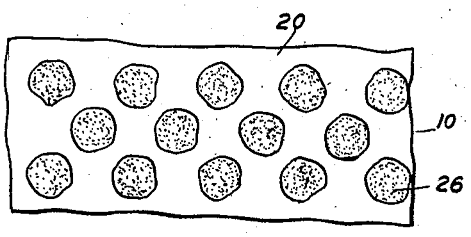
Figure 10:

The invention will be more readily understood by referring to the following description taken in connection with the accompanying drawings forming a part thereof in which:

Figs. 1 to 8, inclusive, show various steps in the process in accordance with the invention of making a two-sided screen or target structure for use in television transmitter tubes;

Fig. 9 is a top view of a schematic representation, in greatly enlarged form, of a portion of a target made in accordance with the method of the invention; and Fig. 10 is a sectional side view of portions of such a target.

Referring more specifically to the drawing, Figs. 9 and 10 show, by way of example for purposes of illustration, portions of a two-sided mosaic target 10 suitable for use in certain television transmitting tubes, such as, for example, the image orthicon type of tube briefly referred to above. It will be understood that Fig. 9 is merely a schematic showing and the same applies to the other figures in the drawing. The target 10 comprises a thin metallic screen 20 of a suitable material, such as nickel, having a large number of holes to the linear inch, e. g., four hundred per inch or more. One surface, such as the top surface in Fig. 10, and the interior of all of the apertures in the screen 20 are coated with an insulating material 22. The interiors of all of these apertures are filled with metallic plugs 26. Successive steps in the preparation of the screen or target 10 will be easily understood by referring to Figs. 1 to 8, inclusive, in each of which the structure around one aperture is represented schematically.

Figure 1:
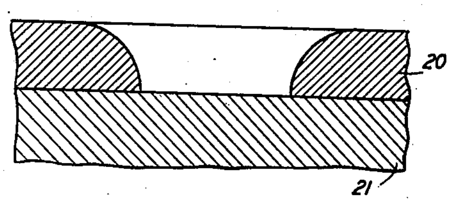
Figure 2:
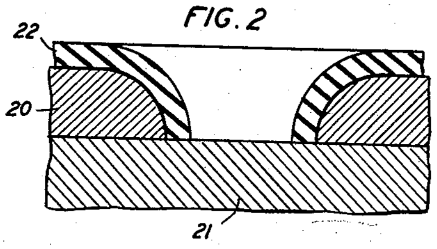
Figure 3:
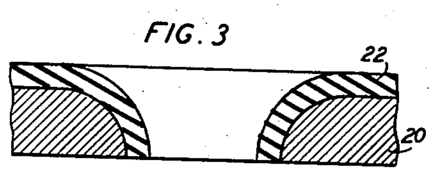

Referring now to Fig. 1, it will be noted that there has been shown, in greatly enlarged form, a section of a nickel screen 20 stretched tightly against a metal support 21. An insulator such as magnesium oxide, beryllium oxide, beryllium carbonate, cryolite or glass is deposited upon the screen by cataphoresis or other suitable process. The insulating coating is represented by the reference character 22 in Fig. 2. The coated screen 20 is then stripped from the metal support 21 and heated for baking purposes. The screen portion at this stage of the process is represented by Fig. 3.

Figure 4:
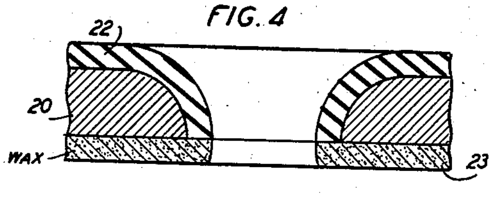
Figure 5:
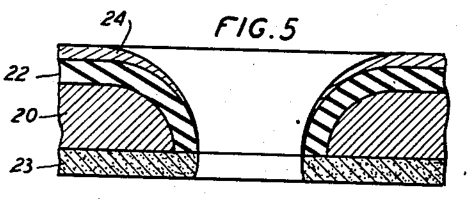

As shown in Fig. 4, a thin coating of wax or asphaltum or etching ink 23 is sprayed upon the bottom of the screen, or rolled on with a gelatine roller. A thin film 24 of silver is then evaporated upon the insulated side 22 of the screen as shown in Fig. 5. In cases where it is desired to metal-coat porous films of insulating material, it has been found that metal films can be evaporated on the insulating material without making thin conducting filaments there-through, whereas trouble in this regard has been encountered in some cases where an electro-plating technique has been employed.

Figure 6:
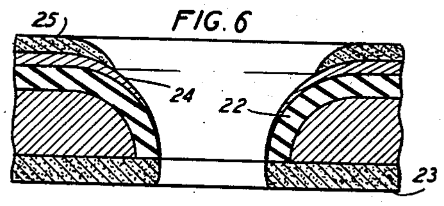

A thin film 25 of wax is then applied to the coating 24 as shown in Fig. 6. The film 25 may be applied by means of the wax transfer method which is as follows: A piece of wax paper is placed in contact with the top of the screen, pressure is applied between the wax paper and the screen and the paper is then stripped away from the screen, leaving a thin film 25 of wax on the silver coating 24. A suitable alternative to this step is to use asphaltum in place of the wax or to use non-conducting ink rolled on both sides of the screen simultaneously (thus replacing the coating 23 as well as the coating 25).

Figure 7:
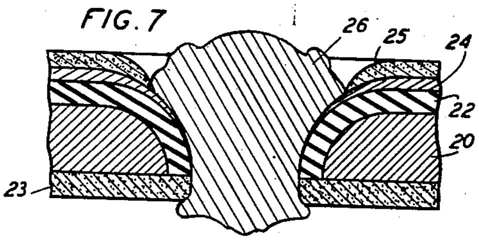
Figure 8:
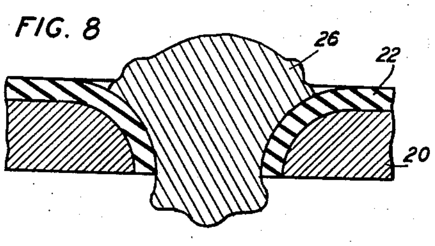

Several plugs 26 are then electroplated into the holes of the screen 20, the electroplating being continued for a period of time necessary to have the plugs built up until they project from both sides of the screen. Once the plugs are free of the restraint imposed upon them by the walls of the holes of the screen 20, the buttons build up sideways as well as in length forming beads thereon which are larger than the smallest diameters of the holes, thus producing locked in buttons as shown in Fig. 7. The electroplating anode in the solution may be placed near either side of the screen (above or below it in Fig. 6) or may be near both sides if two anodes are used. Even if only one anode is used the buttons 26 can be made to protrude from both sides of the screen although one side will probably protrude more than the other unless the screen is turned around one or more times during the electroplating process. The wax films 25 and 26 are then removed by means of a suitable organic solvent. The thin film 24 of silver is then etched off the insulator. As the film 24 is so much thinner than the metallic buttons 26, it is completely removed before much metal is removed from the buttons, This last step may be accomplished either with an etching fluid or by an electrolytic process. The final result, the two-sided mosaic shown in Figs. 9 and 10 and one elemental portion of which is shown in Fig. 8, is produced.

Various alternative steps and procedures other than those mentioned above are of course possible without departing from the spirit of the invention, the scope of which is pointed out in the claims.

What is claimed is:

1. The method of forming a two-sided target which comprises the steps of mounting an apertured metallic screen on a metal support, insulating the exposed surfaces of said screen, removing said metal support thereby exposing one side of said screen, coating said exposed side with non-metallic material which is non-conductive and insoluble in electroplating solution, coating a thin film of metallic material upon said insulated surface of said target, applying a protective coating of said non-metallic material on to said metallic film in such a manner that the portions of said metal film in the apertures are exposed, electroplating in said apertures until metal plugs are formed having heads protruding from both sides of the screen which are larger than the diameter of each aperture at its narrowest point, and removing said protective coatings of non-metallic material and said thin film of metal from the sides of said screen.

2. The method of forming a two-sided target which comprises the steps of mounting an apertured metallic screen with one face tightly against a support plate, insulating the exposed surfaces of said screen including the surfaces of said apertures, removing said support plate thereby exposing one side of said screen, heating said insulated screen to bake said insulating coating, coating said exposed side of said screen with non-metallic material which is non-conductive and insoluble in electroplating solution, coating a thin film of metallic material upon the insulated surface of said screen, applying a protective coating of said non-metallic material on said metallic film in such a manner that the portions of said film in said apertures are exposed electroplating in said apertures until metal plugs are formed having heads protruding from both sides of the screen which are larger than the diameter of each aperture at its narrowest point, and removing said protective coatings of non-metallic material and said thin film of metal from the side of said insulated screen.

References Cited in the file of this patent

UNITED STATES PATENTS

| Number | Name | Date |
|---|---|---|
| 704,401 | Taluau | July 8, 1902 |
| 1,323,167 | Denny | Nov. 25, 1919 |
| 2,045,984 | Flory | June 30, 1936 |
| 2,146,994 | Schroter et al. | Feb. 14, 1939 |
| 2,182,578 | Blumlein et al. | Dec, 5, 1939 |
| 2,217,334 | Diggory et al. | Oct. 8, 1940 |
| 2,392,614 | Prescott | Jan. 8, 1946 |
| 2,539,442 | Larson | Jan. 30, 1951 |

FOREIGN PATENTS

| Number | Country | Date |
|---|---|---|
| 524,354 | Great Britain | Aug. 5, 1940 |